(12) United States Patent
Ebbo et al.

(10) Patent No.: US 7,594,001 B1
(45) Date of Patent: Sep. 22, 2009

(54) PARTIAL PAGE OUTPUT CACHING

(75) Inventors: David S. Ebbo, Redmond, WA (US);
Scott D. Guthrie, Bellevue, WA (US);
Adam W. Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 09/899,539

(22) Filed: Jul. 6, 2001

(51) Int. Cl.
*G06F 15/16* (2006.01)
(52) U.S. Cl. ........................... 709/219; 709/203
(58) Field of Classification Search ......... 709/216–219; 711/118; 715/513, 514
See application file for complete search history.

(56) References Cited

U.S. PATENT DOCUMENTS

| | | | |
|---|---|---|---|
| 3,937,925 A | 2/1976 | Boothroyd | |
| 3,956,615 A | 5/1976 | Anderson et al. | |
| 4,186,871 A | 2/1980 | Anderson et al. | |
| 4,807,154 A | 2/1989 | Scully et al. | |
| 4,847,785 A | 7/1989 | Stephens | |
| 4,949,300 A | 8/1990 | Christenson et al. | |
| 4,979,148 A | 12/1990 | Bush et al. | |
| 5,093,778 A * | 3/1992 | Favor et al. | 712/240 |
| 5,299,315 A | 3/1994 | Chin et al. | |
| 5,349,657 A | 9/1994 | Lee | |
| 5,388,156 A | 2/1995 | Blackledge, Jr. et al. | |
| 5,434,992 A * | 7/1995 | Mattson | 711/119 |
| 5,465,332 A | 11/1995 | Deloye et al. | |
| 5,517,655 A | 5/1996 | Collins et al. | |
| 5,548,340 A | 8/1996 | Bertram | |
| 5,550,560 A | 8/1996 | Kanada et al. | |
| 5,604,908 A | 2/1997 | Mortson | |
| 5,608,890 A * | 3/1997 | Berger et al. | 711/113 |
| 5,638,176 A | 6/1997 | Hobbs et al. | |
| 5,640,449 A | 6/1997 | Worley et al. | |
| 5,664,228 A | 9/1997 | Mital | |

(Continued)

FOREIGN PATENT DOCUMENTS

EP 01111679 A2 12/2000

(Continued)

OTHER PUBLICATIONS

Aggarwal, Charu et al. "Caching on the World Wide Web" IEEE Transactions on Knowledge and Data Engineering, vol. 11, No. 1, Jan./Feb. 1999. pp. 94-107.*

(Continued)

*Primary Examiner*—Andrew Caldwell
*Assistant Examiner*—Benjamin Ailes
(74) *Attorney, Agent, or Firm*—Merchant & Gould P.C.

(57) ABSTRACT

A method provides for output caching of a portion of a web page, and thereby allows the cached portion to be used in web pages for a predetermined period of time without the need to regenerate that portion of the web page. A server computing system receives a request for information from a client computer system. The server computing system creates, in response to the received request, a page having portions. When an output cache contains a portion of the page, the portion of the page contained in the output cache is retrieved from the output cache and when the output cache does not contain a portion of the page, the portion of the page not contained in the output cache is retrieved from another source. The contents of the page are then sent to the client computing system.

27 Claims, 12 Drawing Sheets

U.S. PATENT DOCUMENTS

| | | | |
|---|---|---|---|
| 5,675,520 A | 10/1997 | Pitt, III et al. | |
| 5,706,505 A | 1/1998 | Fraley et al. | |
| 5,732,256 A | 3/1998 | Smith | |
| 5,732,267 A | 3/1998 | Smith | |
| 5,745,103 A | 4/1998 | Smith | |
| 5,748,890 A | 5/1998 | Goldberg et al. | |
| 5,754,774 A * | 5/1998 | Bittinger et al. | 709/203 |
| 5,774,670 A | 6/1998 | Montulli | |
| 5,793,982 A | 8/1998 | Shrader et al. | |
| 5,802,600 A * | 9/1998 | Smith et al. | 711/173 |
| 5,812,996 A | 9/1998 | Rubin et al. | |
| 5,835,724 A | 11/1998 | Smith | |
| 5,855,020 A | 12/1998 | Kirsch | |
| 5,878,141 A | 3/1999 | Daly et al. | |
| 5,878,282 A | 3/1999 | Mital | |
| 5,892,937 A * | 4/1999 | Caccavale | 711/135 |
| 5,897,622 A | 4/1999 | Blinn et al. | |
| 5,911,068 A | 6/1999 | Zimmerman et al. | |
| 5,911,145 A * | 6/1999 | Arora et al. | 715/514 |
| 5,918,007 A | 6/1999 | Blackledge, Jr. et al. | |
| 5,935,207 A * | 8/1999 | Logue et al. | 709/219 |
| 5,940,075 A | 8/1999 | Mutschler, III et al. | |
| 5,940,847 A | 8/1999 | Fein et al. | |
| 5,953,524 A | 9/1999 | Meng et al. | |
| 5,956,489 A | 9/1999 | San Andres et al. | |
| 5,961,601 A | 10/1999 | Iyengar | |
| 5,963,952 A | 10/1999 | Smith | |
| 5,974,430 A * | 10/1999 | Mutschler et al. | 715/505 |
| 5,983,227 A * | 11/1999 | Nazem et al. | 707/10 |
| 5,991,802 A | 11/1999 | Allard et al. | |
| 6,006,230 A | 12/1999 | Ludwug et al. | |
| 6,014,637 A | 1/2000 | Fell et al. | |
| 6,014,666 A | 1/2000 | Helland et al. | |
| 6,032,207 A | 2/2000 | Wilson | |
| 6,038,551 A | 3/2000 | Barlow et al. | |
| 6,067,578 A | 5/2000 | Zimmerman et al. | |
| 6,072,664 A | 6/2000 | Aoyagi et al. | |
| 6,076,108 A | 6/2000 | Courts et al. | |
| 6,101,607 A | 8/2000 | Bachand et al. | |
| 6,108,717 A | 8/2000 | Kimura et al. | |
| 6,115,744 A | 9/2000 | Robins | |
| 6,121,968 A | 9/2000 | Arcuri et al. | |
| 6,128,623 A * | 10/2000 | Mattis et al. | 707/103 R |
| 6,138,150 A | 10/2000 | Nichols et al. | |
| 6,167,438 A * | 12/2000 | Yates et al. | 709/216 |
| 6,167,524 A | 12/2000 | Goodnow et al. | |
| 6,178,461 B1 | 1/2001 | Chan et al. | |
| 6,185,608 B1 * | 2/2001 | Hon et al. | 709/216 |
| 6,203,220 B1 | 3/2001 | Takenoshita et al. | |
| 6,205,480 B1 | 3/2001 | Broadhurst et al. | |
| 6,212,192 B1 | 4/2001 | Mirashrafi et al. | |
| 6,218,958 B1 | 4/2001 | Eichstaedt et al. | |
| 6,230,160 B1 | 5/2001 | Chan et al. | |
| 6,246,422 B1 | 6/2001 | Emberling et al. | |
| 6,247,044 B1 | 6/2001 | Gosling et al. | |
| 6,249,844 B1 * | 6/2001 | Schloss et al. | 711/122 |
| 6,253,228 B1 | 6/2001 | Ferris et al. | |
| 6,253,234 B1 | 6/2001 | Hunt et al. | |
| 6,279,151 B1 | 8/2001 | Breslau et al. | |
| 6,286,133 B1 | 9/2001 | Hopkins | |
| 6,326,957 B1 | 12/2001 | Nathan et al. | |
| 6,334,157 B1 | 12/2001 | Oppermann et al. | |
| 6,343,148 B2 | 1/2002 | Nagy | |
| 6,351,767 B1 * | 2/2002 | Batchelder et al. | 709/219 |
| 6,353,447 B1 | 3/2002 | Truluck et al. | |
| 6,354,477 B1 | 3/2002 | Trummer | |
| 6,363,352 B1 | 3/2002 | Dailey et al. | |
| 6,370,561 B1 | 4/2002 | Allard et al. | |
| 6,373,841 B1 | 4/2002 | Goh et al. | |
| 6,397,253 B1 | 5/2002 | Quinlin et al. | |
| 6,401,099 B1 | 6/2002 | Koppolu et al. | |
| 6,405,241 B2 | 6/2002 | Gosling et al. | |
| 6,412,008 B1 | 6/2002 | Fields et al. | |
| 6,430,575 B1 | 8/2002 | Dourish et al. | |
| 6,460,071 B1 | 10/2002 | Hoffman | |
| 6,460,141 B1 | 10/2002 | Olden | |
| 6,463,442 B1 | 10/2002 | Bent et al. | |
| 6,480,894 B1 | 11/2002 | Courts et al. | |
| 6,487,665 B1 | 11/2002 | Andrews et al. | |
| 6,505,238 B1 | 1/2003 | Tran | |
| 6,542,967 B1 * | 4/2003 | Major | 711/134 |
| 6,546,473 B2 * | 4/2003 | Cherkasova et al. | 711/158 |
| 6,546,516 B1 | 4/2003 | Wright et al. | |
| 6,557,038 B1 | 4/2003 | Becker et al. | |
| 6,560,598 B2 | 5/2003 | Delo et al. | |
| 6,560,618 B1 | 5/2003 | Ims | |
| 6,564,251 B2 | 5/2003 | Katariya et al. | |
| 6,591,272 B1 | 7/2003 | Williams | |
| 6,606,418 B2 | 8/2003 | Mitchell et al. | |
| 6,622,168 B1 * | 9/2003 | Datta | 709/219 |
| 6,633,416 B1 | 10/2003 | Benson | |
| 6,725,219 B2 | 4/2004 | Nelson et al. | |
| 6,728,421 B2 | 4/2004 | Kokemohr | |
| 6,757,708 B1 * | 6/2004 | Craig et al. | 709/203 |
| 6,892,226 B1 * | 5/2005 | Tso et al. | 709/218 |
| 6,915,307 B1 * | 7/2005 | Mattis et al. | 707/103 R |
| 7,171,443 B2 * | 1/2007 | Tiemann et al. | 709/203 |
| 7,249,196 B1 * | 7/2007 | Peiffer et al. | 709/246 |
| 7,320,028 B2 * | 1/2008 | Dinovo | 709/219 |
| 7,343,412 B1 * | 3/2008 | Zimowski | 709/226 |
| 7,509,404 B2 * | 3/2009 | Agrawal et al. | 709/223 |
| 7,523,158 B1 * | 4/2009 | Nickerson et al. | 709/203 |
| 7,523,173 B2 * | 4/2009 | Seki et al. | 709/219 |
| 2001/0054020 A1 | 12/2001 | Barth et al. | |
| 2002/0004815 A1 | 1/2002 | Muhlestein et al. | |
| 2002/0008703 A1 | 1/2002 | Merrill et al. | |
| 2002/0083171 A1 | 6/2002 | Hoogenboom et al. | |
| 2002/0108102 A1 | 8/2002 | Muhlestein et al. | |
| 2002/0188890 A1 | 12/2002 | Shupps et al. | |
| 2003/0004998 A1 * | 1/2003 | Datta | 707/513 |
| 2003/0009476 A1 | 1/2003 | Fomenko et al. | |
| 2003/0009519 A1 | 1/2003 | Gosling et al. | |
| 2003/0009567 A1 | 1/2003 | Farouk | |
| 2003/0018827 A1 | 1/2003 | Gutherie et al. | |
| 2003/0025728 A1 | 2/2003 | Ebbo et al. | |
| 2003/0028565 A1 | 2/2003 | Landsman et al. | |
| 2003/0074634 A1 | 4/2003 | Emmelmann | |
| 2003/0097639 A1 | 5/2003 | Niyogi et al. | |
| 2004/0003112 A1 | 1/2004 | Alles et al. | |
| 2004/0003139 A1 | 1/2004 | Cottrille et al. | |
| 2004/0003248 A1 | 1/2004 | Arkhipov | |
| 2004/0073873 A1 | 4/2004 | Croney et al. | |
| 2005/0027823 A1 * | 2/2005 | Rana | 709/219 |
| 2008/0028149 A1 * | 1/2008 | Pardikar et al. | 711/118 |
| 2008/0155056 A1 * | 6/2008 | Zimowski | 709/217 |
| 2008/0177859 A1 * | 7/2008 | Nickerson | 709/217 |

FOREIGN PATENT DOCUMENTS

| | | |
|---|---|---|
| EP | 1156415 | 11/2001 |
| EP | 1164473 | 12/2001 |
| WO | WO 98/21651 | 5/1998 |
| WO | WO 98/44695 | 10/1998 |
| WO | WO 99/34288 | 7/1999 |

OTHER PUBLICATIONS

"HTML Encyclopaedia"; http://www.scit.wlv.ac.uk/encyc/form.html; 2 pages.

Custer, Helen; "Inside Windows NT"; Microsoft Press 1993; pp. 74-81.

Davulcu, Hasan; Freire, Juliana; Kifer, Michael; Ramakrishnan, I.V.; "A Layered Architecture for Querying Dynamic Web Content"; ACM 1999; pp. 491-502.

Dowd, Tyson et al., "Compiling Mercury to the .NET Common Language Runtime," Electronic Notes in Theoretical Computer Sciences 59 No. 1 (Netherlands) (2001), pp. 1-16.

Frost, Jim: "Windows NT Security"; May 4, 1995; 7 pages; http://world.std.com/~jimf/papers/nt-security/nt-security.html.

Hannay, Phillip et al., "MSIL For the .NET Framework: the Next Battleground?", Virus Bulletin Conference, Sep. 2001, pp. 173-196.

Holmes, John W.; e-Mail response to question regarding GET/POST. HTTP request, extracted from Google's News Groups, php.general, Nov. 11, 2002.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web information organization, sharing, and management,"Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

"NCSA httpd" nttpd@ncsa.uiuc.edu.

O'Leary, M., "Web personalization Does It Your Way," O'Leary Online, vol. 23, No. 2, Mar.-Apr. 1999, pp. 79-80.

Pyarali, Irfan; O'Ryan, Carlos; Schmidt, Douglas; Wang, Nanbor, Gokhale, Aniruddha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310-319.

Syme, Don, "ILX: Extending the .NET Common IL for Functional Language Interoperability"; Electronic Notes in Theoretical Computer Science 59 No. 1 (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

Wu, Dapeng; Hou, Yiwci Thomas; Zhang, Ya-Qin; "Scalable Video Transport over Wireless IP Networks"; IEEE 2000; pp. 1185-1191.

Dobson, Rick; "Data Binding in Dynamic HTML"; DBMS Mar. 1998 pp. 47-52.

Penn, Gerald; Hu, Jianying; Luo, Hengbin; McDonald, Ryan; "Flexible Web Document Analysis for Delivery to Narrow-Bandwidth Devices"; IEEE 2001; pp. 1074-1078.

Esposito, Dino; "Heaven Sent"; Developer Network Journal issue 23 Mar./Apr. 2001 pp. 18-24.

Hovanes, Michael E.; Deal, John R. Grizz; Rowberg, Alan H.; "Seamless Multiresolution Display of Portable Wavelet-Compressed Images" Journal of Digital Imaging, vol. 12, No. 2, suppl 1 May 1999, pp. 109-111.

Ingham; David B; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28-33.

"OOP Launches Hammock at JavaOne" http://www.oop.com/pr2000_06_08.jsp?gui=Plain Jun. 8, 2000, 1 page.

"Hammock: Think of it as Swing for the Web"; Jul. 14, 2000; 10 pages.

Hammond, Eric "Hammock Swings through Web interfaces" www.infoworld.com/articles/mt/xml/00/07/17/000717mthammock.xml; Jul. 14, 2000; 3 pages.

Duan, Nick N.; "Distributed Database Access in a Corporate Environment Using Java" Bell Atlantic Corporation; 1996; 8 pages.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165.

Developing ASP-Based Applications: Microsoft 1996, 5 pages.

"ColdFusion: Web Application Server"; Allair Corp; www.allair.com; 1995-1999.

"Alterego Networks Introduces First Mobile Web Server for Enterprises, Telcos and Providers"; Redwood City, CA; Nov. 14, 2000; 3 pages.

"Bluestone Software Layes Foundation for Internet Operating Environment with Total-E-Server . . . " Screaming Media, Business Wire; Jun. 5, 2000; 3 pages.

Stewart, Tony; "The Document as Application: Issues and Implications" GCA XML Europe 1999; pp. 575-599.

Franklin, Keith; "Supercharge Data Binding"; Visual Basic Programmer's Journal, Mar. 2000; 7 pages.

Shapiro, Marc; "A Binding Protocol for Distributed Shared Objects" Presented at 14th International Conference on Distributed Comp. Sys.; Jun. 21-24, 1994; 17 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

Marshall, James; "HTTP Made Really Easy: A Practical Guide to Writing Clients and Servers"; Aug. 15, 1997; 14 pages.

Chapter 3, "Mechanics of Developing JavaScript Applications"; Server-Side Javascript Guide; Online! 1999; pp. 51-108 www.developer.netscape.com/docs/mauals/ssjs/1_4/ssjs.pdf.

Chapter 6, "Session Mangement Service"; Server Side Javascript Guide; Online! 1999 pp. 125-166 www.developer.netscape.com/docs/manuals/ssjs/1_4/ssjs.pdf.

Anderson, Richard; Homer, Alex; Howard, Rob; Sussman, Dave; "A Preview of Active Server Pages+"; Copyright 2000, Wrox Press, pp. 1-73.

"HTML Encyclopaedia"; http://www.scit.wlv.ac.uk/encyc/form.html; 1995; 2 pages.

"A Brief History of Hypertext" Microsoft Corporation, 1996, 1 page.

European Search Report 01111678.7-2201.

European Search Report 01111680.3-2201.

European Search Report 01111681.1-2201.

European Search Report 01111682.9-2201.

* cited by examiner

```
1   <%@ Register TagPrefix="Fragment" TagName="Simple" Src="fragment.ascx" %>

2   <Script Language="C#" runat=server>
3     public void Page_Load(){
4       DateTime Created = DateTime.Now;

5       CreatedStamp.InnerHtml = Created.ToString("r");
6     }
7   </Script>
8   <Font size=6>Fragment Cache Simple example</Font>
9   <P>
10    <HR size=1>
11    <Fragment:simple id="UserCon1" runat=server />
12    <HR size=1>
13    <Font size=6>This page was created at <Font color=red><B id=CreatedStamp
14    runat=server></B></Font></Font>
```

FIG. 7

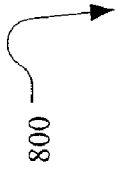

```
1   <%@ Language="C#" %>
2   <%@ OutputCache Duration="10"%>

3   <Script runat=server>
4   public void Page_Load(){
5   // Get the Date and Time, once again this should not change after the first run
6   DateTime NowTime = DateTime.Now;
7   DateTime Expires = NowTime.AddSeconds(10);

8   CreatedStamp.InnerHtml = NowTime.ToString("r");
9   ExpiresStamp.InnerHtml = Expires.ToString("r");
10  }
11  </Script>
12  <Font size=6> Fragment Cache created: <Font color=red><B id=CreatedStamp runat=server></B></Font>
13  <BR>
14  Fragment Cache expires: <Font color=red><B id=ExpiresStamp runat=server></B></Font>
```

FIG. 8

FIG. 9

```
900
1    <%@ Register TagPrefix="Fragment" TagName="Simple" Src="fragment.ascx" %>

2    <Script Language="C#" runat=server>
3    public void Page_Load(){
4        DateTime Created = DateTime.Now;

5        CreatedStamp.InnerHtml = Created.ToString("r");
6    }
7    </Script>

8    <Font size=6>Fragment Cache VaryByControl example:</Font>
9    <P>
10   <HR size=1>
11   <Fragment:simple id="UserCon1" runat=server />
12   <HR size=1>

13   <Font size=6>This page was created at <Font color=red><B id=CreatedStamp runat=server></B></Font></Font>
```

```
1   <%@ Language="C#" %>
2   <%@ OutputCache Duration="60" VaryByControl="Category"%>

3   <Script runat=server>
4   public void Button_Click(Object sender, EventArgs e){
5     if (Category.Value == ""){
6       Response.Cache.SetNoServerCaching();
7       CategoryItem.InnerHtml = "Not cached...";
8     }
9     else
10      CategoryItem.InnerHtml = "You selected: <font color=red>" + Category.Value + "</font>";
11  }
12  public void Page_Load(){
13    // Get the Date and Time, once again this should not change after the first run
14    DateTime NowTime = DateTime.Now;
15    DateTime Expires = NowTime.AddSeconds(60);

16    CreatedStamp.InnerHtml = NowTime.ToString("r");
17    ExpiresStamp.InnerHtml = Expires.ToString("r");
18  }
```

FIG. 10A

```
19  </Script>
20  <form runat=server>
21      <%=Request.QueryString["state"]%>
22      <BR>
23      Category:
24      <select id="Category" size=1 runat=server>
25          <option value="">
26              <!--Select Category-->
27          </option>
28          <option>
29              psychology
30          </option>
31          <option>
32              business
33          </option>
34          <option value="Popular Computer">
35              popular_comp
36          </option>
37      </select>
38      <input type=submit value="Lookup" OnServerClick="Button_Click" runat=server>
39  </form>
40  <Font size=6><B id=CategoryItem runat=server></B>
41      <P>
42          Fragment Cache created: <Font color=red><B id=CreatedStamp runat=server></B></Font>
43          <BR>
44          Fragment Cache expires: <Font color=red><B id=ExpiresStamp runat=server></B></Font>
45  </Font>
```

FIG. 10B

PARTIAL PAGE OUTPUT CACHING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates in general to a method for providing partial page output caching for a networked computer system, and more particularly to a method and apparatus for providing server controlled data caching for portions of dynamically-generated web pages.

BACKGROUND OF THE INVENTION

Over the last several years, the use of the Internet by individuals and business entities has increased significantly as the Internet has become established as a mechanism to disseminate information. The Internet presents information to a user using a web browser that is located on the user's computer. The web browser retrieves and displays web pages from various web servers connected to the Internet. The increase in use of the Internet has caused web servers to provide large numbers of users with the same page as the users request access to the same web pages or at least pages having portions that are the same.

Initially, the web browsers, web servers, and intermediate proxy servers used data caching techniques to assist in shortening the response time when web pages are requested. These caching techniques stored a static version of a web page into data cache memory blocks at any number of locations between the end user's computer and the web server that generated a response to a web page request. Web browsers typically have a local cache to hold temporary files retrieved while the browser is used. When a new web page is requested, the browser may check to see if the requested page exists in the local cache. If the page is in the cache, the web browser may retrieve the requested page from the cache and thus eliminate the need to request information from the web server. Because the cache is typically located locally upon a hard drive of a user's computer, no Internet communication is needed. This response is typically much quicker than sending a request over the Internet. In addition, the use of a cached page eliminates a subsequent web server hit, thereby reducing the processing requirements of the web servers.

Proxy servers are servers located between two portions of a networked computing system. Typically, all of the users are attached to a network located on one side of a proxy server and the web servers providing the requested pages are located upon the other side of the proxy server. In this architecture, the user sends a request for a web page to the proxy server, which in turns sends a request for a web page to the appropriate web server. The web server responds with a web page to the proxy server. The proxy server then forwards the web page to the requesting user.

The proxy servers occasionally possess local cache memory to hold web pages that have been previously requested by users. Similarly, the proxy server may check for the storage of a requested page within its cache before sending a request to the web server. Again, if the page is found, the cached version may be used to eliminate the web server request.

The above uses of cache memory blocks have several deficiencies that diminish their effectiveness. First, these cache blocks store the complete version of a web page when it was last sent from a web server. As such, these cache memory blocks will hold only static web pages. At present, a significant amount of the web pages being requested by users include dynamically-generated content. As such, the web page requested by a first user may not contain all of the same information as the web page requested by a second user. In this circumstance, each web page will need to be considered a unique and different web page. As a result, the benefits of data caching will not be obtained even though most of the data on the different web pages may be identical.

U.S. patent application Ser. No. 09/570,071, filed on May 12, 2000, entitled, "Output Caching Module of an HTTP Pipeline and assigned to the same assignee as the present application, discloses a server caching an output page. When a dynamically-changing web page is requested by a user at a client computer and the web page is available in the web server's output cache, instead of regenerating the web page for output to a client computer, the server retrieves the web page from the output cache and sends the web page to the client computer.

A disadvantage to the solution described in U.S. patent application Ser. No. 09/570,071 is that when portions of a web page are the same, but other portions differ, such web pages will be considered to be different web pages and therefore, could not make use of output page caching.

BRIEF SUMMARY OF THE INVENTION

The present invention relates to a method for providing partial page output caching. The method provides for output caching a portion of a web page, thereby allowing the cached portion to be used in web pages for a predetermined period of time without the need to regenerate that portion of the web page.

In an embodiment of the invention, a server computing system receives a request for information from a client computer system. The server computing system creates, in response to the request, a page having portions. When an output cache contains a portion of the page, the portion of the page contained in the output cache is retrieved from the output cache. When the output cache does not contain a portion of the page, the portion of the page not contained in the output cache is retrieved from another source. The complete contents of the page are then sent to the client computing system.

Another embodiment of the invention includes a machine-readable medium having instructions recorded thereon, such that when the instructions are read and executed by a processor in a computing system connected to a network, the computer is caused to function as a server computing system. The server computing system is then configured to create, in response to a request for information from a client computer system, a page having portions. When an output cache contains a portion of the page, the portion of the page contained in the output cache is retrieved from the output cache. When the output cache does not contain a portion of the page, the portion of the page not contained in the output cache is retrieved from another source. The contents of the page are then sent to the client computing system.

BRIEF DESCRIPTION OF THE DRAWINGS

The present invention is illustrated by way of example and not limitation in the accompanying figures in which like reference numerals indicate similar elements and in which:

FIGS. 7 and 9 are exemplary dynamic content files; and

FIGS. 8, 10A and 10B are exemplary page control files referenced by the dynamic content files of FIGS. 7 and 9, respectively.

DETAILED DESCRIPTION OF THE INVENTION

Embodiments of the present invention provide a framework, whereby portions of a web page may be stored, for a limited period of time, in an output cache associated with a web server. If the portion is required for a requested web page and the portion is stored in the output cache, then the portion will be injected into the markup language, for example, HTML, or any other authoring language supported by a web browser, for delivery to the browser.

Figure 1:
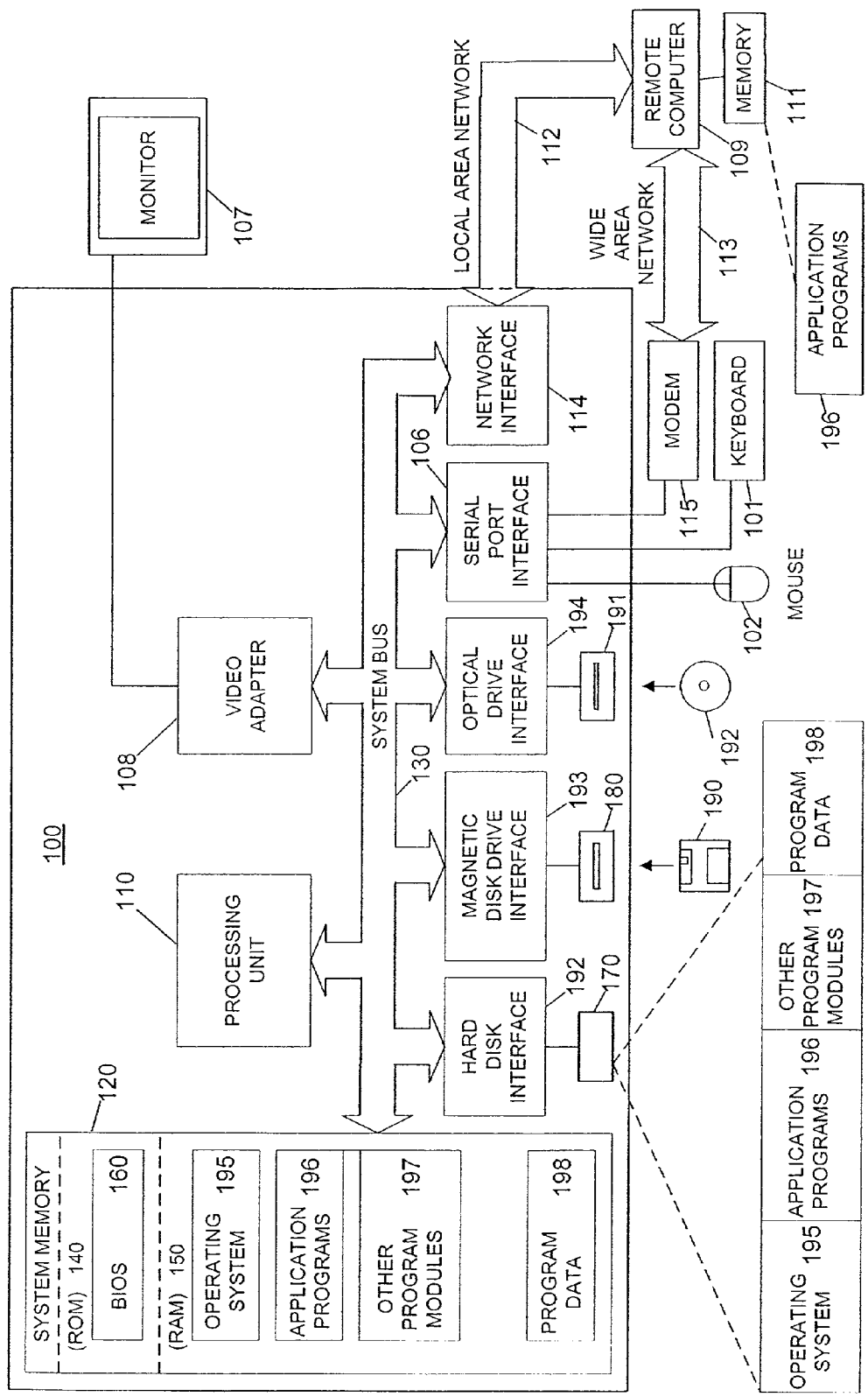
FIG. 1 illustrates an example of a conventional computing system.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

Figure 2:
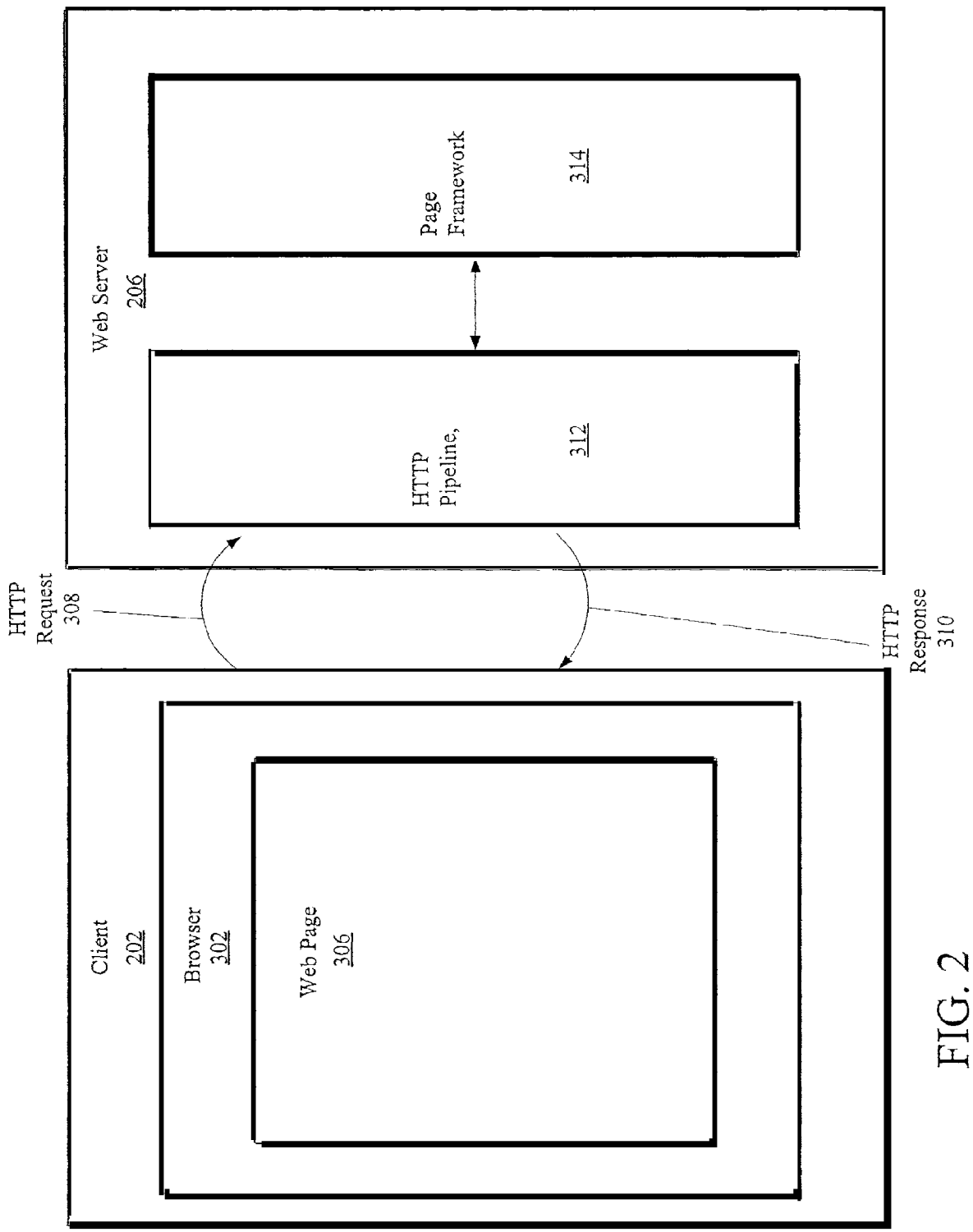
FIG. 2 shows an embodiment of the invention in which a client computing system and a web server are communicating with one another.

FIG. 2 illustrates a web server 206 for dynamically generating web page content for display on a client in an embodiment of the present invention. A client 202 executes a browser 302 that displays a web page 306 on a display device of the client 202. The client 202 includes a client computer system having a display device, such as a video monitor (not shown). An "INTERNET EXPLORER" browser, marketed by Microsoft Corporation, is an example of a browser 302 in an exemplary embodiment of the present invention. Other exemplary browsers include without limitation "NETSCAPE NAVIGATOR" and "MOSAIC" browsers. The browser 302 receives Hypertext Markup Language (HTML) code in a HyperText Transfer Protocol (HTTP) response 310 from a web server 206 and displays the web page as described by the HTML code. Although HTML is described with reference to one embodiment, other authoring languages, including without limitation SGML (Standard Generalized Markup Language) and XML (eXtensible Markup Language), are contemplated within the scope of the present invention.

The communications between the client 202 and the web server 206 are conducted using a sequence of HTTP requests 308 and HTTP responses 310. Although HTTP is described with reference to the exemplary embodiment, other transport protocols, including without limitation HTTPS and S-HTTP, are contemplated within the scope of the present invention. On the web server 206, an HTTP pipeline 312 receives an HTTP request 308, resolves the URL (Universal Resource Locator) contained in the request, and invokes an appropriate handler for processing the request. The HTTP pipeline then passes the request to a page framework 314 for satisfying the HTTP request.

Figure 3:
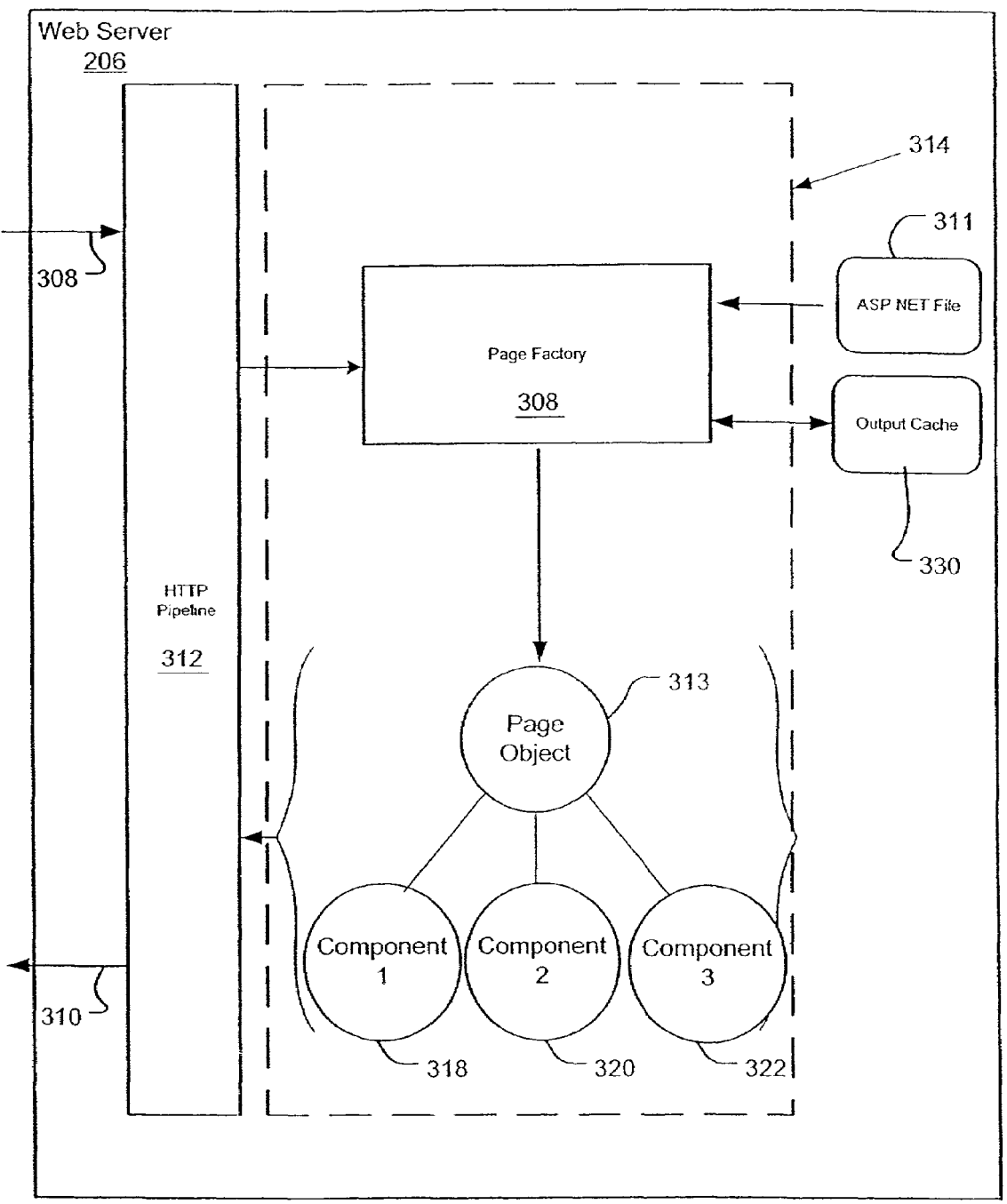
FIG. 3 illustrates the web server of FIG. 2 in more detail.

FIG. 3 provides a more detailed view of the page framework 314. The HTTP Request is passed to a page factory module 308 associated with an ASP.NET page 311. The page factory module 308 is invoked to handle instantiation and configuration of objects from the ASP.NET page 311. The ASP.NET page 311 is identified or referenced by a unique URL and may be further identified by ".aspx" suffix, although other suffixes may be used. When a request for a particular ".aspx" resource is first received by the page factory module 308, the page factory module 308 searches the file system for the appropriate resource or file (e.g., the .aspx page 310). The file may contain text (e.g., authoring language data) or another data format (e.g., byte-code data or encoded data) that may later be interpreted or accessed by the server to service the request. If the physical file exists, the page factory module 308 opens the file and reads the file into memory. If the requested aspx file cannot be found, the page factory module 308 returns an appropriate "file not found" error message, e.g., by sending an HTTP "404" message back to the client.

Once the ASP.NET page 311 is read into memory, the page factory module 308 processes the file contents to create a page object 313, corresponding to web page 306, which is made up of one or more components, for example, components 1 through 3, which correspond to controls, as further described below. When the component corresponds to a user control that has associated output available in the output cache, then the output is retrieved from the output cache and injected into the web page to be sent to the browser.

Figure 4A:
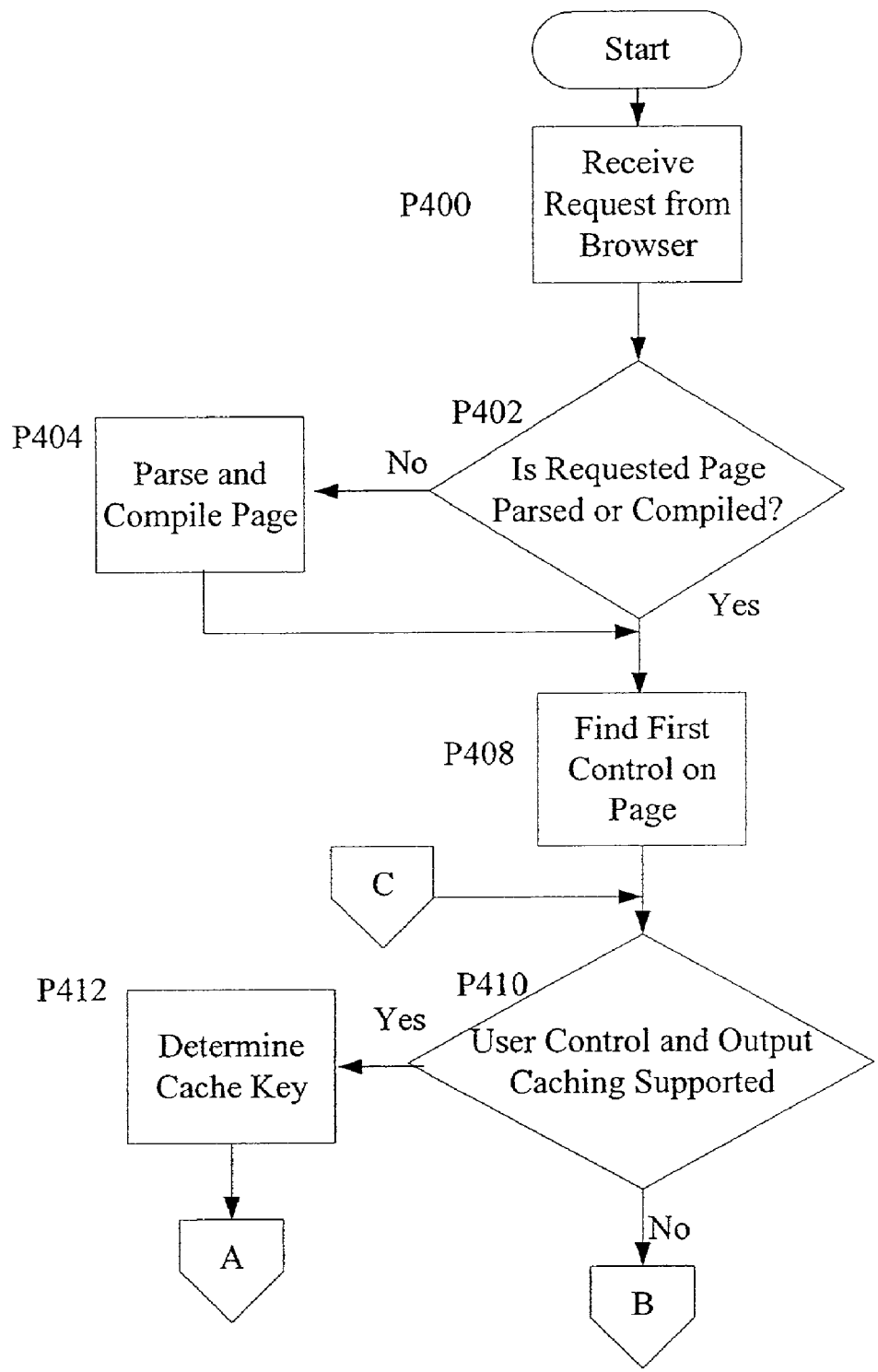
FIGS. 4A and 4B are a flowchart that describes the processing in a server computing system in an embodiment of the invention.
Figure 4B:
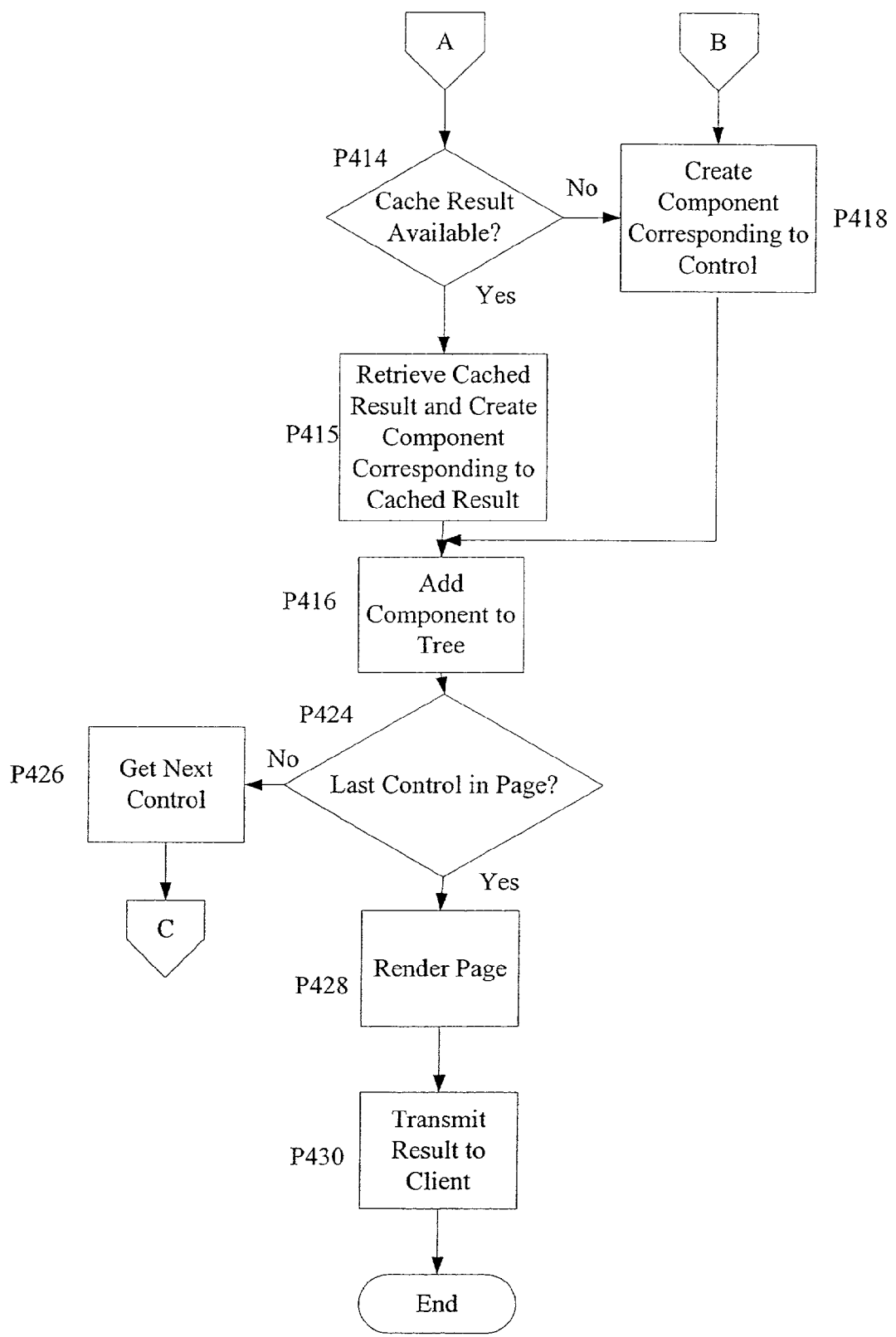

FIGS. 4A and 4B show a flowchart that illustrates the processing in the web server for satisfying a request from a browser.

At P400, the web server receives a request from a browser for a URL. The HTTP pipeline 312 resolves the URL request and passes the request to the page factory module.

At P402, the page factory module determines whether the requested web page has already been parsed or compiled. If the web page was not parsed or compiled, then it is parsed and compiled at P404. Parsing and compiling creates a class that extends a page class.

At P408, the page factory module 308 references the first control of the page. The controls will be described in more detail later.

At P410, a check is made to determine whether a control is a user control that supports output caching. As described later, output caching support can be determined by the presence or absence of an output cache directive.

If output caching is not supported, then, at P418, a component corresponding to the user control is created.

If the check at P410 determines that the control is a user control that supports output caching, then a cache key is determined and at P414, a determination is made as to whether a cached result corresponding to the user control is in the cache. The cache key is a Globally Unique Identifier (GUID) that is unique for each occurrence of a user control on the page. The cache key is created at compile time.

If the result is not in the cache, then P418 is performed, as before, to create a component corresponding to the control.

If the result is in the cache, then at P415, the cached result is retrieved and a component corresponding to the cached result is created.

At P416, the component is inserted into a tree, thereby creating a hierarchical data model having linked components. That is, each component is linked to at least a prior component and a next component, assuming a prior or a next component exists.

At P424, a check is made to determine whether the last control of the requested page had been examined. If the last control had not yet been examined, then P426 is performed to point to the next control and P410 is again performed to determine whether the next control is a user control that supports output page caching.

If the check at P424 determines that the last control had been examined then, at P428, the page is rendered and at P430 the contents of the page is transmitted to the client computing system. The page is rendered using the appropriate markup language, such as HTML for a web browser or any other web page authoring language supported by the web browser.

Figure 5:
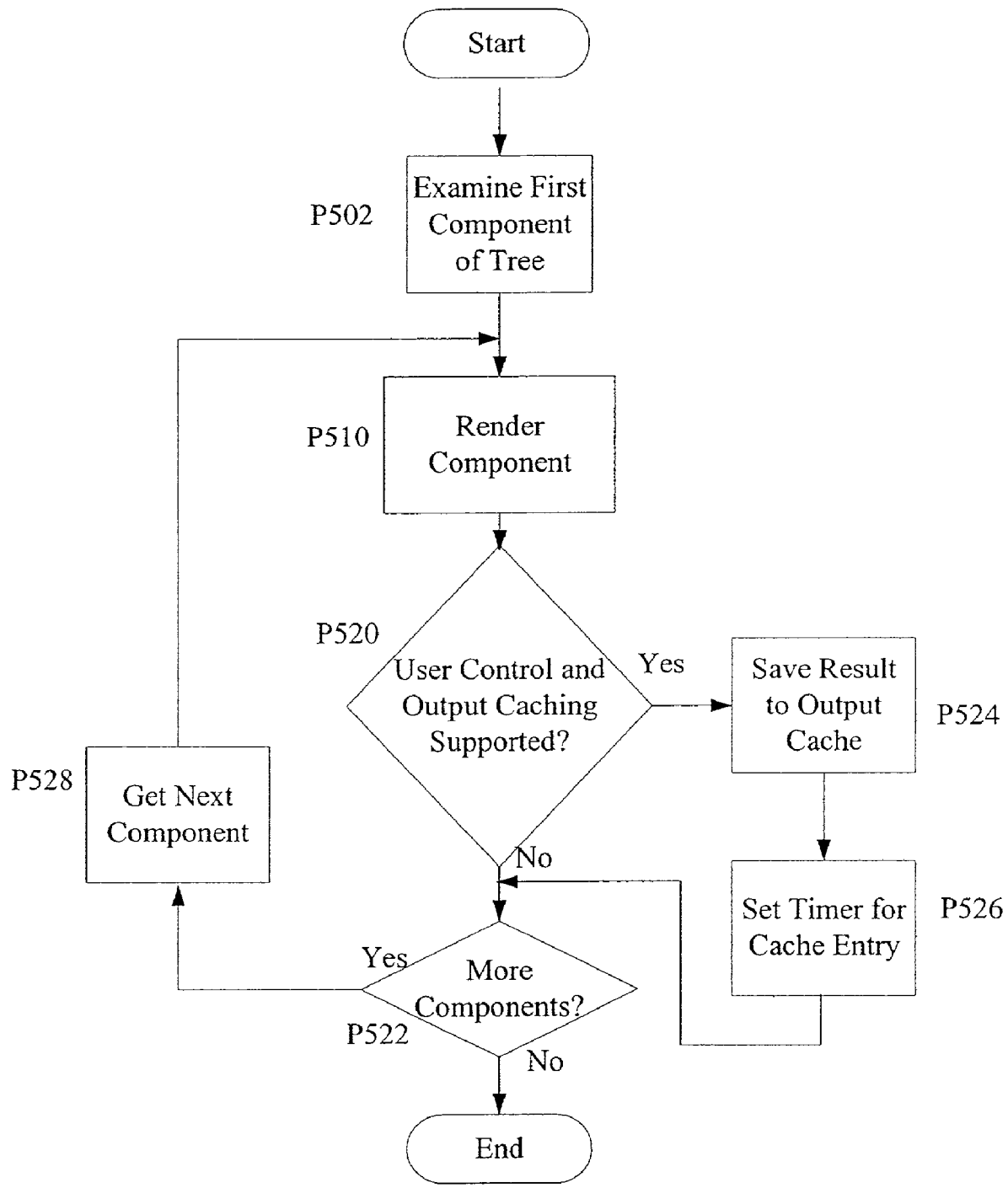
FIG. 5 is a flowchart for explaining the processing that occurs during a rendering process.

FIG. 5 is a flowchart which expands upon and illustrates, in more detail, the processing that occurs in the exemplary embodiment when rendering the page at P428.

At P502, the first component of the tree is retrieved and at P510 the component is rendered into HTML, for example, or any other web page authoring language supported by the browser.

At P520, a check is made to determine whether the rendered component is a user control that supports output caching based on an output cache directive contained in the component. If output caching is supported, then at P524, the results are saved to the output cache and at P526 a timer is set to an amount of time, for example, in seconds, specified in the output cache directive for output caching the component.

At P522, the tree is checked to determine whether any more components exist. If so, then at P528, the next component is obtained and P510 will again be performed to render the component into a web page authoring language supported by the browser. Otherwise, if the check at P522 determines that no additional components exist in the tree, then rendering of the page is complete.

Figure 6:
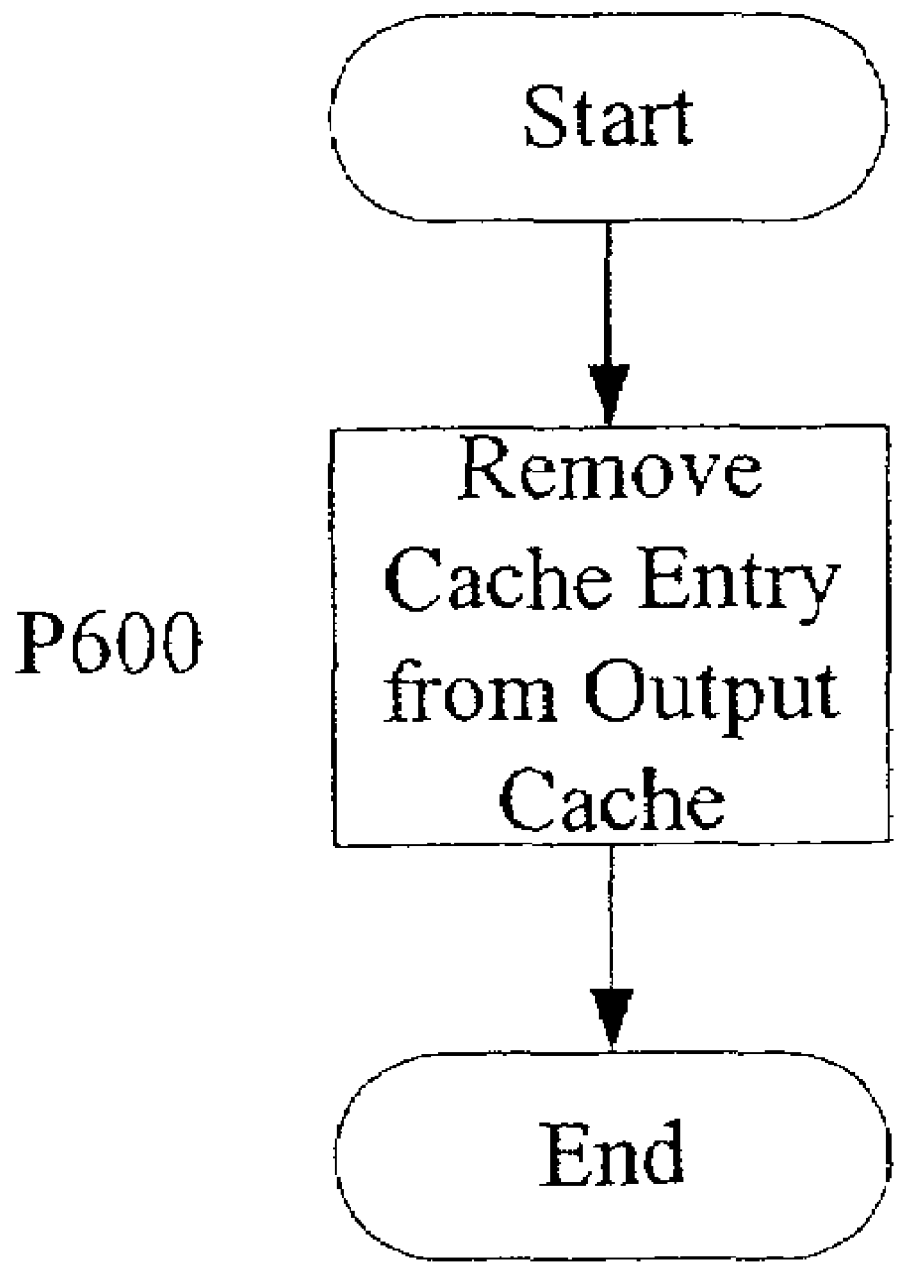
FIG. 6 is a flowchart for explaining the processing that occurs when a cache timer expires in an embodiment of the invention.

FIG. 6 is a flowchart that explains the processing that occurs when the output cache timer, which was set at P526, expires. At P600, the output cache entry corresponding to the expired timer is purged from the output cache, thereby making the cached results unavailable.

FIG. 7 illustrates an exemplary hierarchical dynamic content file 700, for an exemplary web page in an embodiment of the present invention. In the illustrated embodiment, file 700 contains plain-text declarations in an exemplary dynamic content file format using the ASP.NET framework provided by Microsoft Corporation of Redmond, Wash. The ASP.NET framework allows developers to create "ASP.NET" web page files that typically include C#, Visual Basic or Jscript code, as well as other HTML code. The ASP.NET file contains declarations, or tags, that perform various functions, as well as VB, C# or Jscript code. These declarations are generally easier to write than writing actual programming code.

The particular embodiment of file 700 is accessed when the URL, for example, http://www.microsoft.com/page.aspx, is resolved. The first line of the file 700 provides a registration for a user control via a "REGISTER" directive. The "REGISTER" directive has the following format: <% Register TagPrefix="TagPrefixName" TagName="Name" src="fileIdentifier" %>

The TagPrefix and TagName are used when the user control is referenced later in file 700. In this particular embodiment, the user control is referenced in line 11 of file 700, in which an optional ID, "UserCon1" is used. The optional ID allows a programmatic reference to be made to a particular occurrence of the user control. The "src" tag refers to a unique identifier where the web server 316 may find the source file for the user control. Each user control used within a file typically possesses a Register directive to permit the ASP.NET server to resolve all references to user controls used in the file.

Lines 2 through 7 of file 700 comprise a code declaration block. Generally, code declaration blocks define user objects and control object member variables and methods that are executed on the server. Thus, the code declaration block in this example is a server control because it defines code to be executed on the server. The first line of the code declaration block is in the format:

<script [language="language"] runat="server">

.

.

.

</script> where the language parameter is optional and the parameters may appear in any order. In the present exemplary embodiment of the present invention, code declaration blocks are defined using <script> tags that contain a "runat" attribute having a value set to "server". Optionally, a "language" attribute may be used to specify the syntax of the inner code. In this example, the language attribute indicates that the code declaration block is written in a language called C#. It should be understood that the disclosed syntax is used in one embodiment of the present invention, however, alternative embodiments may employ different syntaxes within the scope of the present invention.

Line 11 of file 700 references the user control that was registered in line 1 of file 700. As one can see, the reference to the user control in line 11 uses a tag prefix of "Fragment" and a tag name of "simple", as specified by the Register directive on line 1 of file 700. The user control, in this example, is defined in a file called "fragment.ascx", as specified by the Register directive of line 1 of file 700.

The following, with reference to FIGS. 4A, 4B and 5, explains the processing within a web server, in the exemplary embodiment of the invention, when a request for a URL, corresponding to file 700, is made from a client computer system having a web browser.

First, a user, via the web browser, requests, for example, the URL http://www.microsoft.com/page.aspx. At P400, the request for the URL is received by the web server. The HTTP pipeline within the web server attempts to resolve the URL request and passes the request to the page factory module which causes the file 700 to be accessed.

At P402, a check is made to determine whether the requested page was parsed or compiled, and if not, the page will be parsed and compiled at P404.

At P408, the file 700 is examined for references to any controls. The Register directive, on line 1 of file 700, indicates the existence of a user control that is defined in a file called "fragment.ascx" which will be referenced by a tag prefix of "Fragment" and a tag name of "simple". In this example, no other user controls are present; however, as mentioned earlier, the code declaration block of lines 2 through 7 define a server control and the code at lines 13 through 14, specifically, "<B id=CreatedStamp runat=server></B>" defines another server control.

At P408, the first control on the page, lines 2 through 7 of file 700 is found.

At P410, the control is determined not to be a user control that supports output caching. Therefore, P418 is performed to create a component corresponding to the control.

At P416, the component is added to a tree, thereby building the data model.

At P424, a check is made to determine whether there are other controls in the page. In this example, there are other controls. Therefore, P426 is performed to get the next control.

The next control, in this example is a user control referenced by file 700 and determined to be on line 11 of file 700. In this example, this is the only user control referenced by file 700.

At P410, a determination is made as to whether the user control supports output caching. FIG. 8 shows file 800, which is the file "fragment.ascx". Line 2 of file 800 is an output cache directive, indicating that the output produced by file 800 is to be cached for a time period of 10 seconds. Therefore, the user control does support output caching.

At P412, the output cache key, corresponding to a GUID is determined. The GUID was created at compile time.

At P414 a determination is made as to whether the cached result is available in the output cache.

If the cached result is not available, then at P418, a component is created that corresponds to the user control. In this example, the component includes the content of file 800, which includes instructions for obtaining information encapsulated with instructions for displaying the information on the client computing system's browser.

If, at P414, it is determined that the cached result is available, then the cached result is obtained and stored into a component.

At P416, the cached result is inserted into the tree, thereby further building the data model.

At P424, file 700 is examined to determine whether any other controls exist in the page. A server control is found at lines 13 through 14, as mentioned above. Therefore, P426, P410, P418 and P416 are performed as described above with reference to the first control.

At P424, files 700 and 800 are examined to determine if there are any other controls. Since no other controls exist, in this example, the page is rendered at P428 and the rendered page is transmitted to the client computing system's browser.

The flowchart in FIG. 5 expands upon the processing of P428 in more detail.

At P502, the first component of the tree is examined. In this example, there is three components in the tree. Only the second component corresponds to a user control that supports output caching.

At P502, the first component of the tree is examined.

At P510, the component is rendered.

At P520, the component is determined not to be a component that corresponds to a user control that supports output caching. Therefore, P522 will be performed next.

At P522, it is determined that more components exist. The next component will be retrieved at P522 and P510 will be performed to render the component.

At P520, the component is determined to correspond to a user control component that supports output caching. If, the cached result was available at P414, then the cached result was stored in the component at P415. If this is the case, then the cached result is rendered, at P510, and the check at P520 would conclude that the component does not support output caching, because the contents of the component were already cached.

If the second component of the tree, in our example, refers to a user control with results that were not available in the output cache at P414, then the contents of file 800, i.e., the contents of the user control, are included in the component. At P510, the contents of the component are rendered and at P520, a determination is made that the component does support output caching. The rendered component is then saved in the output cache, at P524, and at P526, a timer is started to time the amount of seconds that the cached entry is allowed to be stored in the output cache.

At P522, a determination is made that a third component exists and P528, P510 and P520 will be performed in the same manner as was done for the first component.

At P522, a determination is made that no additional components in the tree exist and the rendering process is complete.

FIG. 8 shows the exemplary contents 800 of the exemplary user control referenced by line 11 of file 700. Line 1 is a language directive that indicates the language used. In this example, line 1 indicates that the user control is written in C#. Line 2 is an Output Cache Directive that indicates that the output fragment produced by executing the instructions within user control 800 is to be stored in an output cache for a duration of 10 seconds.

Referring back to file 700 in FIG. 7, the instruction on line 4 sets a variable, "DateTime Created" to the present date and time, i.e., "DateTime.Now". At line 5, the date is formatted and the resulting string is set into the CreatedStamp tag. Lines 7-13 contain a code declaration block which references the user control causing the user control to be executed if the output generated by the user control is not already available in the output cache. If the user control is available in the output cache, the output of the user control is retrieved from the output cache. Thus, in the situation in which the referenced user control is available in the cache because, for example, the URL http://www.microsoft.com/page.aspx was requested, for example, 5 seconds earlier, the following text will be sent to the client computing system.

Fragment Cache created: May 22, 2001, 2:05:40 PM

This Page was created at May 22, 2001, 2:05:45 PM

FIG. 9 shows another exemplary hierarchical dynamic content file 900 in an embodiment of the present invention. Like file 700, file 900 also contains plain-text declarations in an exemplary dynamic content file format using the ASP.NET framework provided by Microsoft Corporation. This example is similar to that of FIG. 7, but differs from FIG. 7 in that the user control, which appears on line 11 of file 900, uses the "VaryBy" feature. In this particular case, the "VaryByControl" feature is used.

The "VaryByControl" feature identifies one or more controls by name to uniquely identify cache entries. For example, FIGS. 10A and 10B show file 1000, which is an exemplary user control file, fragment.ascx, referenced by file 900 in FIG. 9, line 11. Line 2 of file 1000 contains an output cache directive, which specifies that the output produced by executing the instructions within file 1000 can be stored in the output cache and made available for a period of 60 seconds. The output cache directive contains the "VaryByControl" feature, indicating the name "Category". "VaryByControl="Category" informs the output cache to vary cached items based on the value of "Category". That is, the output is placed in different cache entries based on the value of "Category".

The instructions of the user control of file 1000 check the value of "Category", and if the value is empty (" ") the value of CategoryItem.InnerHtml is set to "Not cached . . . ". Otherwise, the value of Category.InnerHtml is set to "You selected: <font color=red>"+Category.Value+</font>. See lines 5-10 of file 1000. At lines 14-17 the current date and time and the date and time at expiration of the caching time duration is determined and stored. Lines 21-37 correspond to an HTML select feature. The HTML select feature, when executed on a browser, opens a drop down list box to be displayed on the browser so that the user may select one of the listed items.

Another feature that can appear in the output cache directive is "VaryByParam". The "VaryByParam" feature is similar to the "VaryByControl" feature, but indicates that output caching is to occur according to the values of the parameters listed with the "VaryByParam" feature. The following examples help to clarify this feature. Further, if the "VaryByParam" feature is used with the setting "*", caching is varied by every key/value permutation in a query string or by values that are sent from a web browser when using a <form> with method equal to HTTP POST or GET.

For example, suppose the following output cache directive appears in the user control file which is referenced by a file specified by URL http://localhost/caching/cache.aspx:

<%@ OutputCache Duration="60" VaryByParam="*" %>

Consider the following example of four different exemplary requests for cache.aspx using the HTTP GET protocol to pass parameters:

1. http://localhost/caching/cache.aspx?count=10&location=dallas 2. http://localhost/caching/cache.aspx?count=10&location=newyork&shipcode=t56

3. http://localhost/caching/cache.aspx?location=dallas 4. http://localhost/caching/cache.aspx?location=seattle For the above four requests, four corresponding cache entries will exist because no two requests have the same parameters.

If the output cache directive is replaced by:

<%@ OutputCache Duration="60" VaryByParam="location" %> the output cache is instructed to cache documents that vary by the location parameter. Using the exemplary four requests, requests 1 and 3 will be served by one cache entry, if available, because location=dallas for these two entries.

If the output cache directive is replaced by:

<%@ OutputCache Duration="60" VaryByParam="location;count" %> the output cache is instructed to cache documents that vary by the location and the count parameter. Using the exemplary four requests, one can see that all four requests would be cached separately because requests 1 and 3 vary by count.

Another feature that can be used with the output cache directive is "VaryByCustom", which can have values, VaryByCustom="browser", or VaryByCustom="[user defined string]". For example, if the following output directive is used:

<%@ OutputCache Duration="60" VaryByCustom="browser" %> the output will be cached according to the type of browser requesting the information. That is, the cache will vary by browser name and major browser version.

In order to provide monitoring capability to the web server to enable web page developers to observe the health and performance of caching and of applications running on the server, performance and monitoring counters may be published by, for example, the ASP.NET framework via an Application Program Interface (API), for example, the standard Windows NT PerfMon Application Program Interface (API). This information can be accessed via a "Performance Monitoring" administration tool which is available on all Windows NT systems from Microsoft Corporation of Redmond, Wash.

ASP.NET supports the following "Application" performance counters, which can be used to count the performance of a single instance of an ASP.NET application. A unique instance appears for these counters named "_Total_" which aggregates these counters for all application instances on a machine. The "_Total_" instance is always available—the counters will be zeroed when no specific application instances are present. These counters will be exposed under the "ASP.NET Applications" performance counter object within PerfMon.

Cache Total Entries

Total number of entries within the cache. This counter includes both internal use of the cache by the ASP.NET framework and external use of the cache through exposed APIs.

Cache Total Hits

Total number of hits from the cache. This counter includes both internal use of the cache by the ASP.NET framework and external use of the cache through exposed APIs.

Cache Total Misses

The number of failed cache requests per application. This counter includes both internal use of the cache by the ASP-.NET framework and external use of the cache through exposed APIs.

Cache Total Hit Ratio

Total Hit/Miss ratio for the cache. This counter includes both internal use of the cache by the ASP.NET framework and external use of the cache through exposed APIs.

Cache Total Turnover Rate

The number of additions and removals to the total cache per second. It is useful in helping determine how effectively the cache is being used. If the turnover is large, then the cache is not being used effectively.

Cache API Entries

Total number of entries in the cache, when used via the external APIs (i.e. excluding internal use by the ASP.NET framework).

Cache API Hits

Total number of hits from the cache, when used via the external APIs (i.e. excluding internal use by the ASP.NET framework). Implementation of this counter will require creating a pass-through wrapper around the current APIs to return to external developer code when it requests the Cache object.

Cache API Misses

Total number of failed requests to the cache, when used from the external APIs (i.e. excluding internal use by the ASP.NET framework).

Cache API Hit Ratio

Cache Hit/Miss ratio, when used via the external APIs (i.e. excluding internal use by the ASP.NET framework).

Cache API Turnover Rate

The number of additions and removals to the cache per second, when used via the external APIs (i.e. excluding internal use by the ASP.NET framework). It is useful in helping determine how effectively the cache is being used. If the turnover is large, then the cache is not being used effectively.

Output Cache Entries

Total number of entries in the output cache.

Output Cache Hits

Total number of requests serviced from the output cache.

Output Cache Misses

The number of failed output cache requests per application.

Output Cache Turnover Rate

The number of additions and removals to the output cache per second. It is useful in helping determine how effectively the cache is being used. If the turnover is large, then the cache is not being used effectively.

Output Cache Hit Ratio

Percentage of total requests serviced from the output cache.

Embodiments of the invention may be implemented in hardware, software, or firmware. The firmware may be in a read-only memory and the software may reside on a medium such as a floppy disk or an optical disk.

While the invention has been described with reference to certain illustrated embodiments, the words which have been used herein are words of description, rather than words of limitation. Changes may be made within the purview of the appended claims without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

We claim:

1. A machine-readable medium having instructions recorded thereon, such that when the instructions are read and executed by a processor in a first computing system connected to a network, the first computing system performs a method comprising:

receiving, at the first computing system, a request for a web page from a second computing system, the requested web page having content;

creating on the first computing system a page object having references to component objects in response to the received request for information, the page object being created based on a page file, each component object of the page object representing a user control within the page file, wherein creating the page object includes:

retrieving from an output cache any component object that represents one of the user controls of the page file and is contained in the output cache, and retrieving from another source executable code for any component object that represents one of the user controls of the page file and is not contained in the output cache and instantiating the executable code to create the component object;

determining whether any of the component objects referenced by the page object correspond with a user control that supports output caching; and caching the component object in the output cache if the component object corresponds with a user control that supports output caching, the component object cached using a cache key that comprises an identifier that is unique for each occurrence of the component object, the cache key being created when the page object is created;

inserting the retrieved component objects of the page object and the created component objects of the page object into a hierarchical tree data model at the first computing system, each component object being linked to a prior component object if a prior component object exists, and each component object being linked to a next component object if a next component object exists;

processing the components of the hierarchical tree data model to create a renderable page at the first computing system; and sending the created renderable page from the first computing system to the second computing system.

2. The medium of claim 1 wherein:

the user control including an output caching directive, wherein caching the component object in the output cache comprises caching the component object according to the output caching directive.

3. The medium of claim 2, wherein;

the step of processing the created objects comprises processing each one of the components individually.

4. The medium of claim 3, further comprising:

creating the hierarchical tree data model including each of the components and a hierarchical relationship among the components, the data model being used during the step of processing the components.

5. The medium of claim 2, wherein the output caching directive includes a time duration during which the component object is permitted to reside in the output cache.

6. The medium of claim 5, wherein the output caching directive includes an attribute indicating a condition for varying the component object to be stored in the output cache.

7. The medium of claim 6, wherein the attribute indicates that the component object is to be stored in the output cache according to a type of browser used by the second computing system.

8. The medium of claim 6, wherein the attribute indicates that the component object is to be stored in the output cache according to values of at least one parameter.

9. The medium of claim 1, wherein the contents of the created renderable page comprises an HTML specification for a web page.

10. The medium of claim 1, further comprising providing, on the first computing system, performance counters to monitor output caching performance.

11. The medium of claim 10, wherein the performance counters include:

an output cache hit counter to count a number of requests serviced from the output cache; and an output cache miss counter to count a number of failed output cache requests.

12. The medium of claim 10, wherein the performance counters include an output cache turnover rate to count a number of additions and removals to the output cache per second.

13. The medium of claim 10, wherein the performance counters include an output cache hit ratio to keep track of a percentage of total requests serviced from the output cache.

14. A method for providing a response to a request for information from a client computing system to a server computing system having an output cache for storing static portions of web pages, the method comprising:

receiving a request from the client computing system for a web page having a plurality of components, each of the components of the requested web page being either a static component or a dynamic component;

generating the requested web page including:

determining whether an output cache on the server computing system contains any static components of the web page;

retrieving each of the static components contained in the output cache, wherein each of the static components is cached using a cache key that comprises an identifier that is unique for each occurrence of the static components, the cache key being created when each static component is created;

creating at the server computing system each of the static components not contained in the output cache by retrieving executable code for each respective component from another source and instantiating the retrieved executable code;

determining whether any dynamic components correspond to user controls that support output caching;

creating at the server computing system each of the dynamic components by processing each dynamic component corresponding to a user control including retrieving the executable code from the file-and instantiating the retrieved executable code, and by processing each dynamic component that does not correspond to a user control; and assembling the static components and the dynamic components into a hierarchal data model at the server computing system, the static components and dynamic components being linked to each other in the hierarchical data model;

generating contents for the web page by processing each of the static components and each of the dynamic components of the hierarchal data model; and sending the generated contents to the client computing system.

15. A method comprising:

receiving at a server computing device from a client computing device a request for a web page;

retrieving at the server computing device a page file associated with the requested web page, the page file including control references, which include instructions for obtaining associated page components of the requested web page, each control reference including either a user control or a server control, the instructions of each server control being stored within the page file, the instructions of each user control being stored in a separate file;

examining the page file at the server computing device to identify whether each of the control references is a user control or a server control;

examining each user control at the server computing device to determine whether the user control supports output caching including accessing the separate file and analyzing the instructions of the user control to determine whether the instructions contain an output caching directive;

determining whether the page component associated with each user control that supports output caching is available at a cache of the server computing device;

obtaining from the cache the page component associated with each user control that supports output caching and that is available at the cache of the server computing device, the page component cached using a cache key that comprises an identifier that is unique for each occurrence of the page component, the cache key being created when the page component is created;

generating the page component associated with each user control that supports output caching and is not available at the cache of the server computing device;

generating the page component associated with each user control that that does not support output caching including generating the page component based on the instructions associated with the user control;

generating the page component associated with each server control; and inserting the generated page components into a hierarchical tree model at the server computing device, each page component being linked to a prior page component if a prior page component exists, and each page component being linked to a next page component if a next page component exists.

16. The method of claim 15, wherein the output caching directive indicates a length of time for which the associated page component is to be stored in the cache on the server computing system.

17. The method of claim 15, wherein the page file comprises an HTML specification for a web page.

18. The method of claim 15, further comprising arranging the page components into a data model to facilitate rendering the requested web page based on the page components.

19. The method of claim 18, wherein arranging the page components into the data model comprises arranging the page components into a hierarchical tree data model.

20. The method of claim 15, wherein generating the page component associated with each user control that supports output caching and is not available comprises:
   retrieving the instructions that are associated with the page components from the respective separate file; and
   generating the page components based on the retrieved instructions.

21. The method of claim 15, further comprising:
   storing in the cache of the server computing device any generated page component that supports output caching and that is not available at the cache of the server computing device.

22. The method of claim 21, wherein the output caching directive indicates a condition for varying the page component to be stored in the cache on the server computing device.

23. The method of claim 15, wherein the output caching directive indicates the page component is to be stored in the cache according to a type of browser used by the client computing system.

24. The method of claim 15, wherein the output caching directive indicates the page component is to be stored in the cache according to values of at least one parameter listed in the page file.

25. The method of claim 15, further comprising providing on the server computing system at least one performance counter to monitor caching performance.

26. The method of claim 25, wherein the performance counter includes:
   an output cache hit counter to count a number of requests serviced from the cache;
   an output cache miss counter to count a number of failed cache requests; and
   an output cache turnover rate to count a number of additions and removals to the cache per second.

27. The method of claim 25, wherein the performance counter includes an output cache hit ratio to keep track of a percentage of total requests serviced from the cache of the server computing device.

* * * * *